United States Patent
Iwasa et al.

(10) Patent No.: US 10,724,633 B2
(45) Date of Patent: Jul. 28, 2020

(54) VEHICLE AND METHOD FOR CONTROLLING THE SAME

(71) Applicants: JATCO Ltd, Fuji-shi, Shizuoka (JP); NISSAN MOTOR CO., LTD., Yokohama-shi, Kanagawa (JP)

(72) Inventors: Hiroki Iwasa, Atsugi (JP); Hironori Miyaishi, Sagamihara (JP); Sungpil Ryu, Atsugi (JP); Tetsuya Izumi, Ayase (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 406 days.

(21) Appl. No.: 15/559,031

(22) PCT Filed: Feb. 18, 2016

(86) PCT No.: PCT/JP2016/054655
§ 371 (c)(1),
(2) Date: Sep. 15, 2017

(87) PCT Pub. No.: WO2016/152337
PCT Pub. Date: Sep. 29, 2016

(65) Prior Publication Data
US 2018/0080553 A1 Mar. 22, 2018

(30) Foreign Application Priority Data

Mar. 23, 2015 (JP) .................................. 2015-059517

(51) Int. Cl.
*F16H 61/662* (2006.01)
*B60W 20/00* (2016.01)
(Continued)

(52) U.S. Cl.
CPC ....... *F16H 61/66272* (2013.01); *B60K 6/543* (2013.01); *B60L 7/14* (2013.01);
(Continued)

(58) Field of Classification Search
CPC .......... B60K 6/543; B60L 15/20; B60L 7/14; B60W 10/08; B60W 10/10; B60W 10/18;
(Continued)

(56) References Cited

U.S. PATENT DOCUMENTS

2013/0080004 A1 3/2013 Hattori et al.

FOREIGN PATENT DOCUMENTS

JP 2008-155891 A 7/2008
JP 2013-086649 A 5/2013
(Continued)

*Primary Examiner* — Jacob S. Scott
(74) *Attorney, Agent, or Firm* — Foley & Lardner LLP (57) ABSTRACT

The present invention is related to a vehicle including a motor-generator, a transmission, a shift hydraulic control unit, and a CVT control unit (CVTCU). When a downshift of the transmission is performed without an acceleration request from a driver, the CVTCU sets a pulley thrust at a secondary pulley on the basis of a first lower limit as a lower limit, which is a sum of a fundamental thrust and a first correction thrust. The CVTCU also sets a pulley thrust at a primary pulley on the basis of a second lower limit as a lower limit, which is a sum of the fundamental thrust and a second correction thrust.

6 Claims, 9 Drawing Sheets

(51) Int. Cl.
    *B60L 15/20*     (2006.01)
    *B60W 10/10*     (2012.01)
    *B60L 7/14*     (2006.01)
    *B60W 30/18*     (2012.01)
    *B60W 10/08*     (2006.01)
    *B60W 10/18*     (2012.01)
    *B60K 6/543*     (2007.10)

(52) U.S. Cl.
    CPC ............. *B60L 15/20* (2013.01); *B60W 10/08* (2013.01); *B60W 10/10* (2013.01); *B60W 10/18* (2013.01); *B60W 20/00* (2013.01); *B60W 30/18127* (2013.01); *B60W 2540/10* (2013.01); *B60W 2540/12* (2013.01); *B60Y 2200/92* (2013.01); *B60Y 2300/18125* (2013.01); *Y02T 10/7258* (2013.01); *Y10S 903/918* (2013.01); *Y10S 903/945* (2013.01)

(58) Field of Classification Search
    CPC ............. B60W 20/00; B60W 2540/10; B60W 30/18127; B60Y 2200/92; B60Y 2300/18125; F16H 2059/147; F16H 61/66272; F16H 9/18; Y02T 10/7258; Y10S 903/918; Y10S 903/945
    See application file for complete search history.

(56) References Cited

FOREIGN PATENT DOCUMENTS

| | | |
|---|---|---|
| WO | WO-2011-145222 A1 | 11/2011 |
| WO | WO-2013-058139 A1 | 4/2013 |

VEHICLE AND METHOD FOR CONTROLLING THE SAME

TECHNICAL FIELD

The present invention relates to a vehicle and a method for controlling the same.

BACKGROUND ART

WO2011/145222A discloses a technique that temporarily lowers an instructed pressure of a primary pressure at a start of downshift of a belt-type continuously variable transmission enhances shift responsiveness.

SUMMARY OF INVENTION

With a belt-type continuously variable transmission, a primary pressure is lowered at a downshift to increase a differential pressure between the primary pressure and a secondary pressure, ensuring improving a shift speed. For example, in the case where a sudden braking intending a vehicle stop is performed, this allows easily shifting a speed ratio to a Lowest speed ratio, namely, a maximum speed ratio until the vehicle stop, thereby ensuring enhancing vehicle startability. Accordingly, to downshift the belt-type continuously variable transmission, lowering the primary pressure as much as possible is desirable in terms of shift responsiveness.

However, a vehicle that includes a motor-generator as a driving source and an electric generator in addition to the belt-type continuously variable transmission increases an input torque to the belt-type continuously variable transmission in association with a regeneration by the motor-generator during deceleration. To allow a transmission of the input torque by the belt-type continuously variable transmission, a target hydraulic pressure for a primary pulley and a target hydraulic pressure for a secondary pulley need to be set.

In view of this, when the vehicle that includes the belt-type continuously variable transmission and the motor-generator lowers the primary pressure for the downshift, a belt sandwiching force at the primary pulley lowers, possibly resulting in a belt slip. To prevent this belt slip, an amount of regeneration of the motor-generator is lowered to reduce the belt sandwiching force required for the regeneration and the belt slip can be prevented. However, since the amount of regeneration lowers, fuel efficiency is possibly lost.

The present invention has been made in consideration of such technical problem. The object is to provide a vehicle and a method for controlling the vehicle that allow both an improvement in fuel efficiency by regeneration by a motor-generator and shift responsiveness even at a sudden braking for downshift.

One aspect of the present invention provides a vehicle including a motor-generator, and a variator to which a driving force from the motor-generator is transmitted, having a primary pulley whose groove width is changed by controlling a primary pressure, a secondary pulley whose groove width is changed by controlling a secondary pressure, and a belt wound around the primary pulley and the secondary pulley, and a control unit that controls the primary pressure and the secondary pressure. When a downshift of the variator is performed without an acceleration request from a driver, the control unit sets a target hydraulic pressure for the secondary pressure and a target hydraulic pressure for the primary pressure as follows. Namely, the control unit sets the target hydraulic pressure for the secondary pressure on a basis of a first guaranteed capacity, which first guaranteed capacity includes, as a torque capacity guaranteed at the secondary pulley during the downshift, a cooperative regeneration capacity and a first braking capacity. Here, a torque input to the variator in association with a regeneration by the motor-generator is transmittable at the cooperative regeneration capacity, and a torque input to the variator in association with a braking when the braking is performed is transmittable at the first guaranteed capacity. Furthermore, the control unit sets a target hydraulic pressure for the primary pressure on a basis of a second guaranteed capacity, which second guaranteed capacity includes, as a torque capacity guaranteed at the primary pulley during the downshift, the cooperative regeneration capacity, and a second braking capacity that is set lower than the first braking capacity.

According to another aspect of the present invention, a method for controlling a vehicle that includes a motor-generator and a variator to which a driving force from the motor-generator is transmitted is provided. In this aspect, the variator includes a primary pulley whose groove width is changed by controlling a primary pressure, a secondary pulley whose groove width is changed by controlling a secondary pressure, and a belt wound around the primary pulley and the secondary pulley. The method controls the primary pressure and the secondary pressure, in which method, when a downshift of the variator is performed without an acceleration request from a driver, a target hydraulic pressure for the secondary pressure and a target hydraulic pressure for the primary pressure are set as follows. Namely, the method sets the target hydraulic pressure for the secondary pressure on a basis of a first guaranteed capacity, which first guaranteed capacity includes, as a torque capacity guaranteed at the secondary pulley during the downshift, a cooperative regeneration capacity and a first braking capacity. Here, a torque input to the variator in association with a regeneration by the motor-generator is transmittable at the cooperative regeneration capacity, and a torque input to the variator in association with a braking when the braking is performed is transmittable at the first guaranteed capacity. The method further sets a target hydraulic pressure for the primary pressure on a basis of a second guaranteed capacity, which second guaranteed capacity includes, as a torque capacity guaranteed at the primary pulley during the downshift, the cooperative regeneration capacity, and a second braking capacity that is set lower than the first braking capacity.

With these aspects, for the downshift, the target hydraulic pressure for the primary pressure and the target hydraulic pressure for the secondary pressure are set on the basis of the cooperative regeneration capacity. Accordingly, even if the torque input to the variator in association with the regeneration by the motor-generator increases, the belt does not slip.

With these aspects, since the target hydraulic pressure for the secondary pressure is set on the basis of the first braking capacity during the downshift, a belt sandwiching force according to the first braking capacity can be generated at the secondary pulley. Since the belt is pulled from the primary pulley side to the secondary pulley side according to this, the belt sandwiching force according to the first braking capacity can be generated alto at the primary pulley. Accordingly, with these aspects, the belt does not slip during the sudden braking.

Accordingly, these aspects improve in fuel efficiency by regeneration by the motor-generator even during sudden braking.

With these aspects, the target hydraulic pressure for the primary pressure is set on the basis of a primary guaranteed capacity including the second braking capacity set lower than the first braking capacity. Therefore, lowering the primary pressure allows increasing a differential pressure between the primary pressure and the secondary pressure. Accordingly, these aspects also ensure enhancing shift responsiveness.

DESCRIPTION OF EMBODIMENTS

The following describes embodiments of the present invention with reference to the accompanying drawings.

First Embodiment

Figure 1:
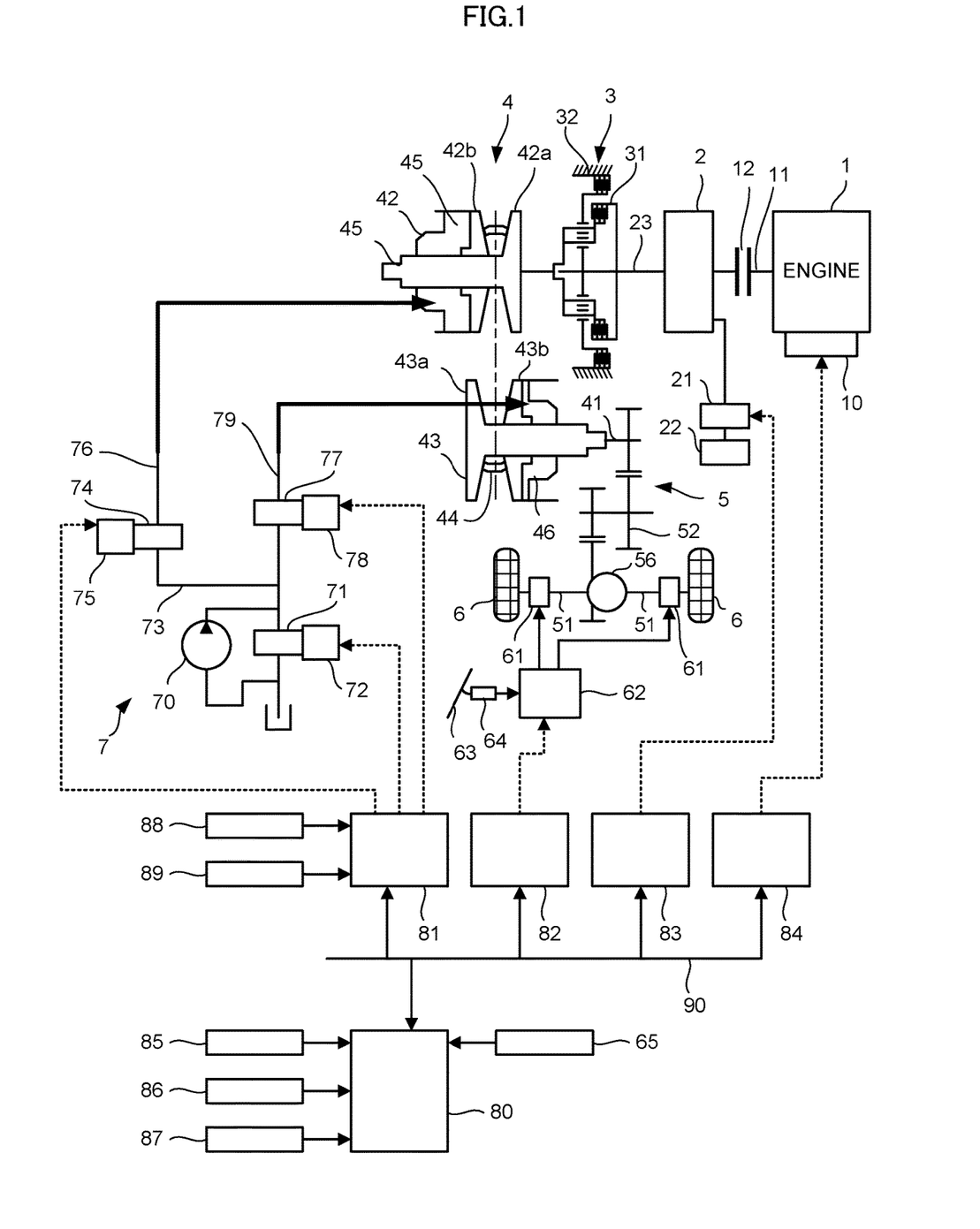
FIG. 1 is a schematic configuration diagram of a vehicle of a first embodiment.

FIG. 1 is a schematic configuration diagram of a vehicle of this embodiment. The vehicle includes an engine 1 and a motor-generator 2 as a driving source. An output rotation of the engine 1 or the motor-generator 2 is transmitted to driving wheels 6 via a steering reverser mechanism 3, a transmission 4, and a final reduction gear 5.

The engine 1 includes a control-target unit 10 as a target for control to control the engine 1. The control-target unit 10, for example, includes a fuel injection valve and a throttle valve. The control-target unit 10 operates the engine 1 at a desired torque on the basis of a command from an engine control unit 84 to rotate an output shaft 11. Between the engine 1 and the motor-generator 2, a first clutch 12 is disposed. The first clutch 12 intermits a rotation between the engine 1 and the motor-generator 2.

The motor-generator 2 is driven by electric power output from an inverter 21. The motor-generator 2 has regenerative electric power input to the inverter 21. The inverter 21 operates the motor-generator 2 with a desired torque on the basis of a command from a motor control unit 83. The motor-generator 2 is, for example, constituted of a synchronous rotating electrical machine driven by a three-phase alternating current. The inverter 21 is coupled to a battery 22.

The steering reverser mechanism 3 is disposed between the driving source formed of the engine 1 and the motor-generator 2, and the transmission 4. The steering reverser mechanism 3 switches a rotation direction of a rotation input from the output shaft 23 between a forward rotation direction corresponding to forward running and a reverse rotation direction corresponding to reverse running to input the rotation to the transmission 4.

The steering reverser mechanism 3 specifically includes a forward clutch 31 and a reverse brake 32. The forward clutch 31 is coupled with a rotation direction as the forward rotation direction. The reverse brake 32 is coupled with the rotation direction as the reverse rotation direction. One of the forward clutch 31 and the reverse brake 32 is configured as a second clutch that intermits the rotation between the engine 1 and the motor-generator 2, and the transmission 4.

The transmission 4 includes a transmission output shaft 41, a primary pulley 42, a secondary pulley 43, and a belt 44 wound around the primary pulley 42 and the secondary pulley 43. The primary pulley 42 is hereinafter also simply referred to as the pulley 42 and the secondary pulley 43 is also simply referred to as the pulley 43. The transmission 4 is a variator constituted of a belt-type continuously variable transmission mechanism that changes a winding diameter of the belt 44 to shift, by changing respective groove widths of the pulley 42 and the pulley 43.

The primary pulley 42 includes a fast pulley 42a and a movable pulley 42b. Controlling a primary pressure, which is a pulley pressure supplied to a primary hydraulic chamber 45, operates the movable pulley 42b to change the groove width of the primary pulley 42. A driving force from the motor-generator 2 is transmitted to the primary pulley 42 via the steering reverser mechanism 3. Hereinafter, the primary pressure is referred to as a PRI pressure.

The secondary pulley 43 includes a fast pulley 43a and a movable pulley 43b. Controlling a secondary pressure, which is a pulley pressure supplied to a secondary hydraulic chamber 46, operates the movable pulley 43b to change the groove width of the secondary pulley 43. Hereinafter, the secondary pressure is referred to as a SEC pressure.

The belt 44 is wound around a sheave surface having a V shape formed of the fast pulley 42a and the movable pulley 42b of the primary pulley 42 and a sheave surface having a V shape formed of the fast pulley 43a and the movable pulley 43b of the secondary pulley 43.

The final reduction gear 5 transmits output rotation from the transmission output shaft 41 to the driving wheels 6. The final reduction gear 5 includes a plurality of gear trains 52 and a differential gear 56. Axle shafts 51 are coupled to the differential gear 56 to rotate the driving wheels 6.

The driving wheel 6 includes a brake 61. The brake 61 has braking force controlled by a brake actuator 62 on the basis of a command from a brake control unit 82. The brake actuator 62 controls braking force of the brake 61 on the basis of a brake fluid pressure, which is generated by transforming a pedal force of a brake pedal 63 by a master cylinder 64.

Hydraulic pressure from a shift hydraulic control unit 7 is supplied to the primary pulley 42 and the secondary pulley 43 of the transmission 4.

The shift hydraulic control unit 7 includes an oil pump 70, a regulator valve 71, a line pressure solenoid 72, a line pressure oil passage 73, a first pressure regulating valve 74, a PRI pressure solenoid 75, a PRI pressure oil path 76, a second pressure regulating valve 77, a SEC pressure solenoid 78, and a SEC pressure oil path 79.

The regulator valve 71 regulates a hydraulic pressure generated by an oil discharged from the oil pump 70 to a line pressure PL. The line pressure solenoid 72 operates the regulator valve 71. The line pressure PL is supplied to the first pressure regulating valve 74 and the second pressure regulating valve 77 by the line pressure oil passage 73. The first pressure regulating valve 74 is operated by the PRI pressure solenoid 75 to supply the PRI pressure oil path 76 with the PRI pressure. The second pressure regulating valve 77 is operated by the SEC pressure solenoid 78 to supply the SEC pressure oil path 79 with the SEC pressure.

The line pressure solenoid 72, the PRI pressure solenoid 75, and the SEC pressure solenoid 78 operate according to a command from a CVT control unit 81 to control the respective hydraulic pressures. Accordingly, the shift hydraulic control unit 7 controls the line pressure PL, the PRI pressure, and the SEC pressure together with the CVT control unit 81.

The CVT control unit 81, the brake control unit 82, the motor control unit 83, and the engine control unit 84 are communicatively coupled to one another together with a hybrid control module 80 via a CAN 90.

To the CVT control unit 81, signals from a PRI pressure sensor 88 and a SEC pressure sensor 89 are input. The PRI pressure sensor 88 detects an actual PRI pressure, an actual pressure of the PRI pressure. The SEC pressure sensor 89 detects an actual SEC pressure, an actual pressure of the SEC pressure. To the CVT control unit 81, signals from a brake sensor 65 and an accelerator position sensor 85 are also input via the hybrid control module 80. Besides, to the CVT control unit 81, signals from a primary rotation sensor, a secondary rotation sensor, and a similar sensor are also input.

The CVT control unit 81 transmits a command to the shift hydraulic control unit 7 on the basis of the input signal to control the line pressure PL, the PRI pressure, and the SEC pressure together with the shift hydraulic control unit 7 as described above.

The hybrid control module 80 manages a consumption energy of the whole vehicle to control the driving of the engine 1 and the motor-generator 2 for enhancing energy efficiency.

To the hybrid control module 80, signals from the brake sensor 65, which detects the pedal force by the brake pedal 63, and the accelerator position sensor 85, which detects a depression amount of an accelerator pedal, are input. An acceleration request from a driver can be detected by the accelerator position sensor 85. Besides, signals from a vehicle speed sensor 86, an inhibitor switch sensor 87, and the like and information from the respective control units via the CAN 90 are input to the hybrid control module 80.

The hybrid control module 80 calculates a target driving torque and a target braking torque from these signals and information. Since a fluid pressure braking torque is a remain that a regenerative braking torque portion, which is a maximum regenerative torque that can be generated in the motor-generator 2, is subtracted from the target braking torque, the target braking torque is a sum of the regenerative braking torque and the fluid pressure braking torque. The hybrid control module 80 performs regeneration at the motor-generator 2 during deceleration.

The brake control unit 82 outputs a driving command to the brake actuator 62 on the basis of a control command from the hybrid control module 80. The brake control unit 82 obtains information of the brake fluid pressure that is being generated in the brake actuator 62 to transmit the information to the hybrid control module 80.

The motor control unit 83 outputs a target power running command as a positive torque command or a target regeneration command as a negative torque command to the inverter 21 on the basis of the control command from the hybrid control module 80. The motor control unit 83 detects an actual current value and the like applied to the motor-generator 2 to obtain actual motor driving torque information, thus transmitting the information to the hybrid control module 80.

The engine control unit 84 outputs the command to the control-target unit 10 on the basis of the control command from the hybrid control module 80. The engine control unit 84 transmits actual engine driving torque information obtained from a rotation speed, a fuel injection quantity, and the like of the engine 1 to the hybrid control module 80.

Figure 2:
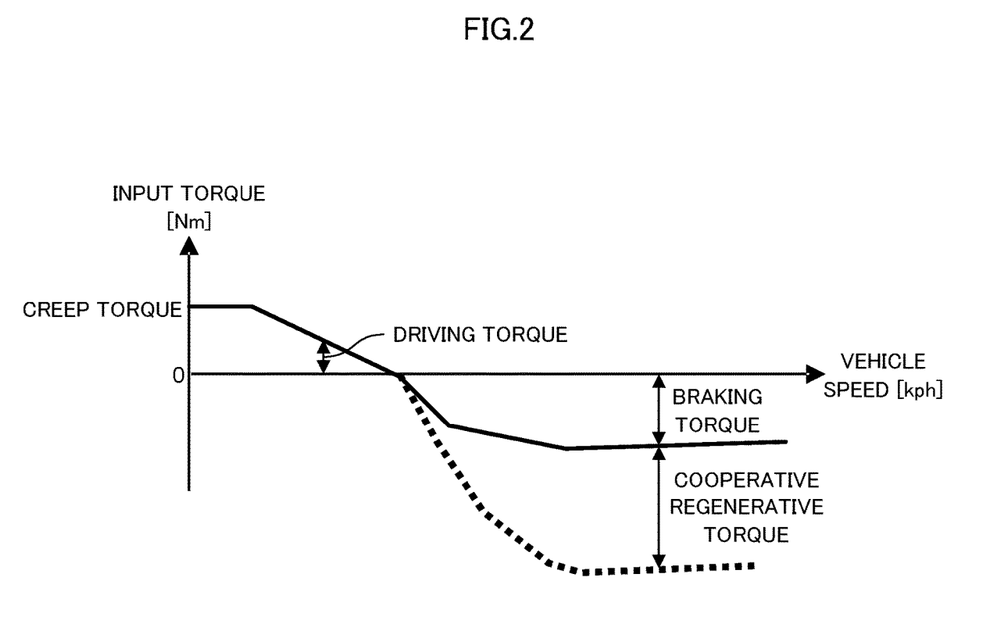
FIG. 2 is an explanatory diagram of an input torque to a transmission during deceleration.

The following describes the input torque to the transmission 4 during the deceleration with reference to FIG. 2. FIG. 2 describes one example of the input torque during the deceleration in the case where the vehicle stops after the deceleration by pressing the brake pedal 63 with the accelerator pedal disengaged.

During the deceleration, the motor-generator 2 performs the regeneration according to a cooperative regenerative torque. Accordingly, the cooperative regenerative torque is set as a torque transmitted by the transmission 4 during the deceleration. The cooperative regenerative torque is a torque to perform the regeneration by the motor-generator 2 and is a negative torque. The cooperative regenerative torque is specifically the above-described regenerative braking torque.

The brake 61 performs the braking according to a braking torque during the deceleration. In view of this, the braking torque is also set as a torque transmitted by the transmission 4 during the deceleration. The braking torque is a torque to perform the braking of the vehicle and is a negative torque. The braking torque is specifically the above-described fluid pressure braking torque.

As the vehicle speed lowers, the input torque to the transmission 4, namely, the cooperative regenerative torque and the braking torque become zero. Further reduction in vehicle speed causes the cooperative regenerative torque to remain to be zero, and a driving torque indicated by the positive torque is set. Before the vehicle speed becomes zero, the second clutch is set in a slip state and the driving torque is set to a creep torque with the vehicle speed of zero.

Provisionally, assume that the vehicle does not include the motor-generator 2, the transmission 4 does not need to transmit the cooperative regenerative torque during the deceleration. Meanwhile, in this embodiment, the transmission 4 needs to transmit the cooperative regenerative torque during the deceleration for appropriate regeneration by the motor-generator 2.

During the deceleration, the downshift of the transmission 4, which returns a speed ratio to a Low side such as a Lowest speed ratio, is performed to ensure enhancing vehicle startability when the vehicle stops after the deceleration. However, when the cooperative regenerative torque needs to be transmitted during the deceleration, as described next, a shift thrust to perform the downshift of the transmission 4 becomes difficult to be secured.

Figure 3:
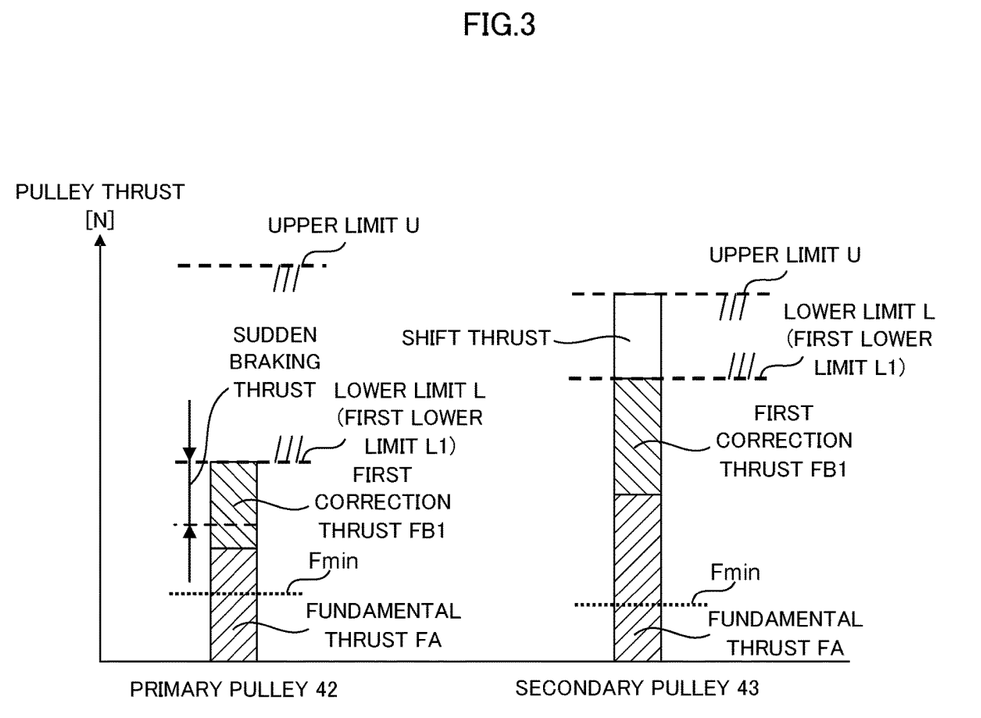
FIG. 3 is an explanatory diagram of a pulley thrust during the deceleration.

FIG. 3 is an explanatory diagram of the pulley thrust during the deceleration. The "during the deceleration" is similar to the one described in FIG. 2. FIG. 3 illustrates the pulley thrusts generated according to the pulley pressures in the respective pulley 42 and pulley 43. A lowest thrust Fmin is a pulley thrust according to a lower limit setting value of the pulley pressure.

The pulley 42 and the pulley 43 each secure torque capacities according to the pulley thrusts. Upper limits U and lower limits L are set to the pulley thrusts of the respective pulley 42 and pulley 43.

An upper limit U is determined according to strength and input and output of an amount of oil. A lower limit L is set according to a guaranteed capacity, which is a torque capacity guaranteed for the downshift free from the acceleration request from the driver. The guaranteed capacity is specifically a minimum torque capacity required to guarantee the transmission of the torque input to the transmission 4 and prevent the belt 44 from slipping during the downshift free from the acceleration request from the driver.

The pulley thrusts are set on the basis of the lower limits L to the respective pulley 42 and pulley 43. Specifically, the pulley thrust is set to a sum of the lower limit L and the shift thrust. The shift thrust can be set in a range of a magnitude obtained by subtracting the lower limit L from the upper limit U. The pulley thrust is specifically set by setting a target hydraulic pressure. Accordingly, it can be said that the setting of the pulley thrust is, in other words, the setting of the target hydraulic pressure.

It can be said that the lower limit L is a thrust at which the above-described guaranteed capacity is generated. Therefore, the pulley thrusts of the respective pulley 42 and pulley 43 are set on the basis of the lower limits L, thus being set on the basis of the guaranteed capacities.

The lower limits L of the respective pulley 42 and pulley 43 can be, for example, specifically set to first lower limits L1 indicated by the parentheses. The first lower limit L1 is a sum of a fundamental thrust FA and a first correction thrust FB1. The fundamental thrust FA and the first correction thrust FB1 are as follows.

That is, the fundamental thrust FA is a thrust set on the basis of the input torque to the transmission 4; therefore, on the basis of the cooperative regenerative torque and the braking torque as described in FIG. 2. The first correction thrust FB1 is a thrust set on the basis of a correction element, which should be taken into further consideration in addition to the fundamental thrust FA.

Specifically, the correction element includes, for example, a hydraulic pressure safety factor. The correction element includes a loss occurred in the oil pump 70 during the hydraulic pressure supply and an inertia torque of the engine 1 and the motor-generator 2. The correction element further includes the slip prevention of the belt 44 during the sudden braking.

The "during the sudden braking" means the case where the brake pedal 63 is pressed larger than a predetermined amount in a predetermined time, for example, a maximum pressing of the brake pedal 63 by an instantaneous operation. Hereinafter, the slip prevention of the belt 44 during the sudden braking as the correction element is simply referred to as a sudden braking correction element.

The sudden braking correction element is taken into consideration when the brake pedal 63 is pressed regardless of whether the sudden braking has been actually performed. The sudden braking correction element is taken into consideration to prepare for the actual execution of the sudden braking. In view of this, when the brake pedal 63 is pressed, a sudden braking thrust is set to the first correction thrust FB1 on the basis of the sudden braking correction element. The sudden braking thrust guarantees the slip prevention of the belt 44 against a worst inertia torque occurred according to the sudden braking.

In the vehicle of this embodiment, the fundamental thrust FA increases by the amount that the transmission 4 needs to transmit the cooperative regenerative torque during the deceleration compared with the case that the transmission 4 does not need to perform the transmission. Consequently, the lower limit L also increases according to this increase; therefore, it is difficult to secure the shift thrust by the amount.

With the insufficient shift thrust, there may be a possibility that the downshift of the transmission 4 is not completed during the deceleration. This possibly results in deterioration of the vehicle startability. If the downshift of the transmission 4 is not completed, the rotation speed of the motor-generator 2 lowers compared with the case where the downshift of the transmission 4 is completed. Consequently, this causes a possibility that an amount of energy regeneration of the motor-generator 2 lowers.

In view of this, for example, it is also considered that the shift responsiveness of the transmission 4 is enhanced as described next.

Figure 4:
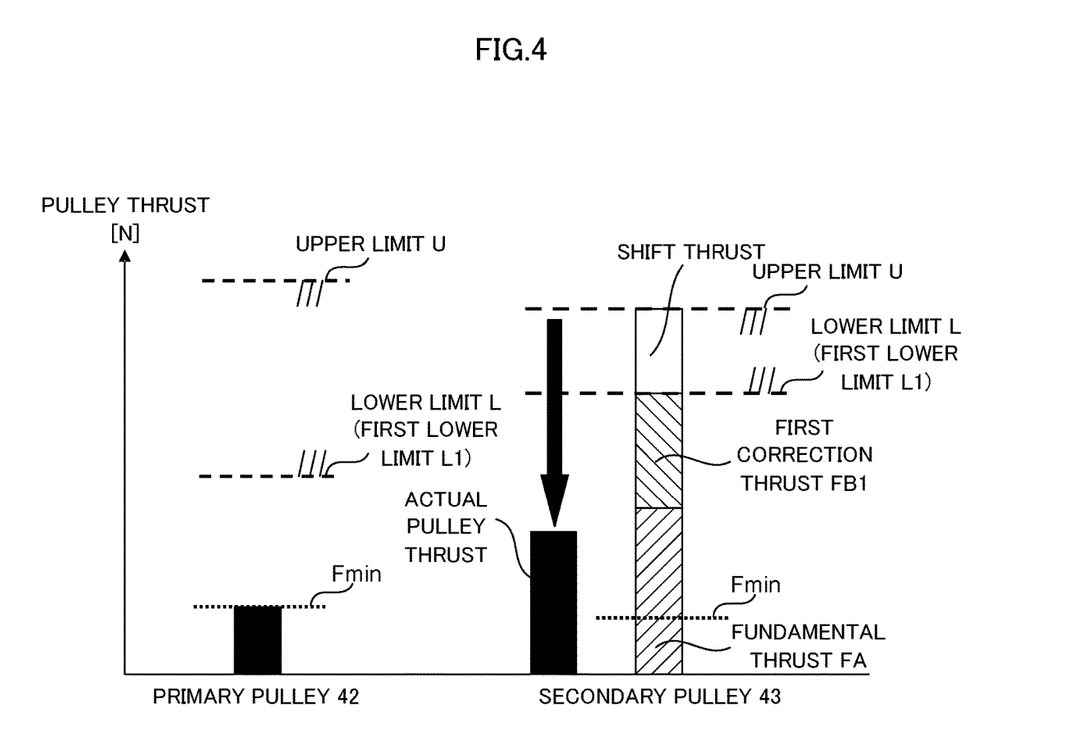
FIG. 4 is a drawing illustrating a comparative example of a setting of the pulley thrust during the deceleration.

FIG. 4 is a drawing illustrating a comparative example of the setting of the pulley thrust during the deceleration. The "during the deceleration" is similar to the one described in FIG. 2. In this example, to enhance the shift responsiveness of the transmission 4, the lower limit L is ignored at the primary pulley 42 and the pulley thrust is lowered down to the lowest thrust Fmin. This allows increasing a differential pressure between the PRI pressure and the SEC pressure, thereby ensuring enhancing the shift responsiveness of the transmission 4.

However, with the thus set pulley thrust, the slip of the belt 44 possibly occurs as follows. That is, in this case, lowering the PRI pressure causes the primary pulley 42 to operate so as to expand the groove width. As a result of lowering tensile force of the belt 44 in response to this, the secondary pulley 43 operates so as to narrow the groove width. At this time, the volume of the secondary hydraulic chamber 46 increases.

If the oil supply to the secondary hydraulic chamber 46 does not catch up with the volume increase of the secondary hydraulic chamber 46, the actual pulley thrust of the secondary pulley 43 lowers as illustrated in the drawing. Consequently, the sandwiching force of the belt 44 at the secondary pulley 43 lowers, possibly causing the belt 44 to slip. Especially, with the accelerator pedal disengaged, an amount of discharged oil by the oil pump 70 using the engine 1 as the driving source also lowers in association with the reduction in the rotation speed of the engine 1. This flails to sufficiently supply the oil to the secondary hydraulic chamber 46, possibly causing the belt 44 to slip.

Therefore, in the vehicle of this embodiment, the lower limit L is set as described next.

Figure 5:
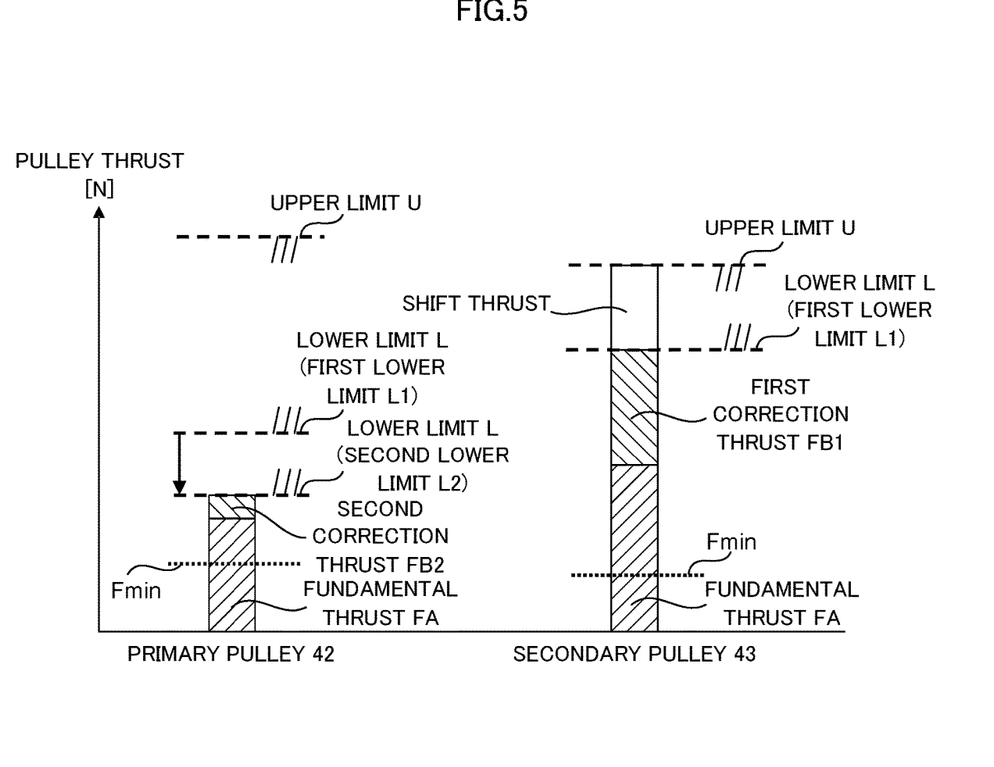
FIG. 5 is a drawing illustrating a setting example of a lower limit during the deceleration in the first embodiment.

FIG. 5 is a drawing illustrating a setting example of the lower limit L during the deceleration in this embodiment. The "during the deceleration" is similar to the one described in FIG. 2. The lower limit L is set to a sum of the fundamental thrust FA and a second correction thrust FB2 at the primary pulley 42.

The second correction thrust FB2 is a thrust where the first correction thrust FB1 is changed as follows. That is, the second correction thrust FB2 is a thrust that applies a low setting thrust, which is a thrust set lower than the sudden braking thrust during the deceleration, instead of the sudden braking thrust.

In view of this, the second correction thrust FB2 is set lower than the first correction thrust FB1 of the pulley 42 illustrated in FIG. 3. As the result, the lower limit L of the pulley 42 is set to a second lower limit L2 lower than the first lower limit L1. This allows the PRI pressure to be set low by the amount that the lower limit L of the pulley 42 lowers from the first lower limit L1 to the second lower limit L2. This ensures increasing the differential pressure between the PRI pressure and the SEC pressure, thereby ensuring enhancing the shift responsiveness of the transmission 4.

Specifically, the low setting thrust gradually lowers the low setting thrust from the sudden braking thrust during the deceleration; therefore, the low setting thrust is set lower than the sudden braking thrust and is set to a target value. The target value is, for example, zero and can be preset on the basis of, for example, experiments. This reduction in the low setting thrust gradually lowers the second lower limit L2 from the first lower limit L1, and the second lower limit L2 is set to the target lower limit in the case where the low setting thrust is set as the target value.

The lower limit L of this embodiment is set by the CVT control unit 81 and is specifically set as described next. Hereinafter, the CVT control unit 81 is referred to as the CVTCU 81.

Figure 6:
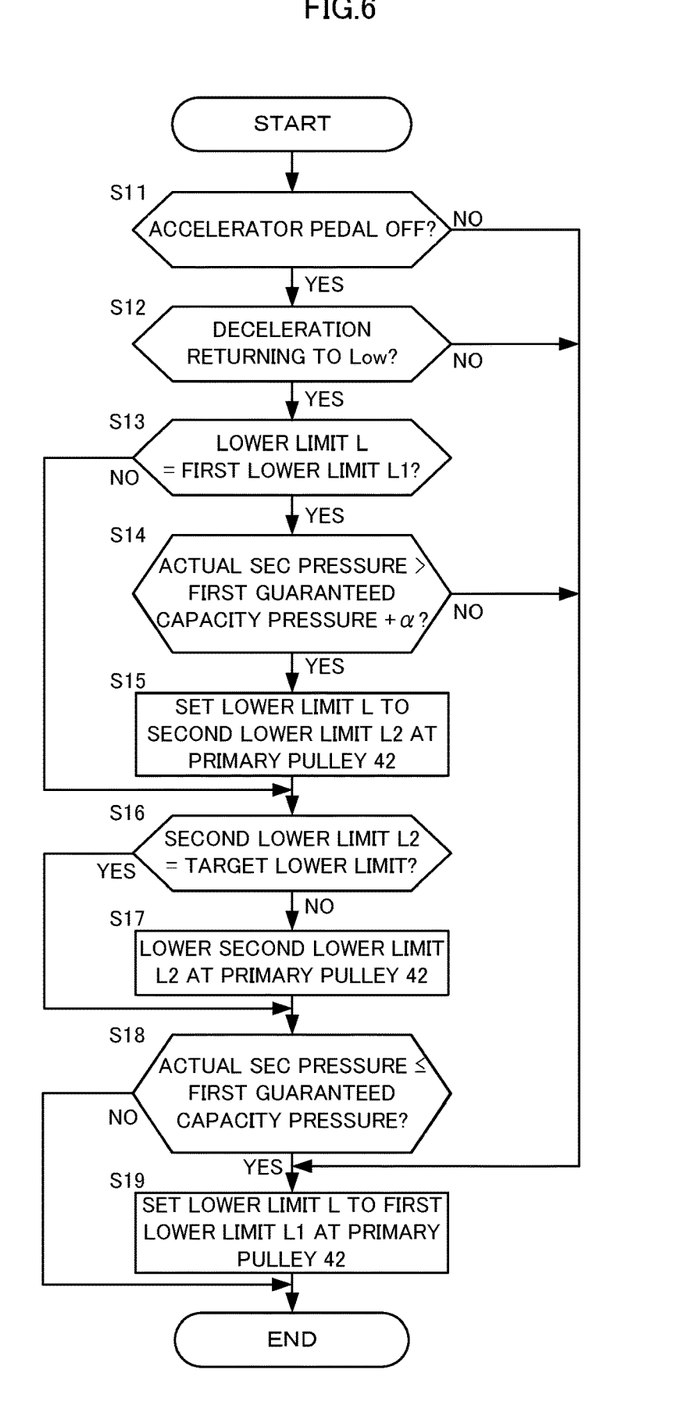
FIG. 6 is a drawing illustrating one example of a control in the first embodiment by a flowchart.

FIG. 6 is a drawing illustrating one example of the control performed by the CVTCU 81 and one example of the setting method for the lower limit L at the primary pulley 42 by a flowchart. The CVTCU 81 can repeatedly perform the processes of this flowchart by minute time.

At Step S11, the CVTCU 81 determines whether the accelerator pedal is OFF, that is, whether the accelerator pedal has been disengaged. At Step S11, the CVTCU 81 performs this determination to determine whether the driver has made the acceleration request.

The negative determination at Step S11 advances the process to Step S19. In this case, the lower limit L described in FIG. 5 is not set but the CVTCU 81 sets the lower limit L to the first lower limit L1 at the primary pulley 42. After Step S19, the processes of this flowchart are terminated.

The positive determination at Step S11 advances the process to Step S12. In this case, the CVTCU 81 determines whether the state is in deceleration during returning to Low. Whether the state is in the deceleration during returning to Low can be determined by, for example, the determination whether the brake pedal 63 has been pressed and a target speed ratio is on the Low side relative to an actual speed ratio. Whether the state is in the deceleration during returning to Low may further be determined by the determination whether the vehicle speed is larger than a predetermined value. The predetermined value is, for example, zero.

The negative determination at Step S12 advances the process to Step S19. The positive determination at Step S12 is determined that the transmission 4 is downshifted during the deceleration, and the process proceeds to Step S13. In this case, the CVTCU 81 determines whether the lower limit L of the pulley 42 is the first lower limit L1. The positive determination at Step S13 advances the process to Step S14.

At Step S14, the CVTCU 81 determines whether the actual SEC pressure is larger than a sum of a first guaranteed capacity pressure and a predetermined value α. The first guaranteed capacity pressure is a pulley pressure that generates the first lower limit L1 and generates a first guaranteed capacity by generating the first lower limit L1. The predetermined value α is a value to set the margin to the actual SEC pressure for comparison of the actual SEC pressure with the first guaranteed capacity pressure and can be preset on the basis of, for example, experiments. The negative determination at Step S14 advances the process to Step S19.

The positive determination at Step S14 advances the process to Step S15. In this case, the CVTCU 81 sets the lower limit L to the second lower limit L2 at the primary pulley 42.

At Step S16, the CVTCU 81 determines whether the second lower limit L2 is the target lower limit. When the process proceeds to Step S16 through the positive determination at Step S13, the negative determination is performed at Step S16 and the process proceeds to Step S17.

At Step S17, the CVTCU 81 lowers the second lower limit L2 at the pulley 42. At Step S17, the CVTCU 81 specifically lowers the low setting thrust from the sudden braking thrust by a predetermined degree to lower the second lower limit L2 by a predetermined degree.

At Step S18, the CVTCU 81 determines whether the actual SEC pressure is equal to or less than the first guaranteed capacity pressure. The negative determination at Step S18 once terminates the processes of this flowchart.

In this case, when the process proceeds to Step S13 in the subsequent routine, the negative determination is performed at Step S13 and Step S14 and Step S15 are skipped. When the second lower limit L2 is not the target lower limit, as a result of the negative determination at Step S16, the second lower limit L2 is lowered at Step S17. The negative determination at Step S18 repeats the similar process.

This gradually lowers the second lower limit L2 to the target lower limit. When the second lower limit L2 reaches the target lower limit, the thrust by the sudden braking thrust is removed from the second lower limit L2 with the target value of the low setting thrust being zero. When the second lower limit L2 reaches the target lower limit, the positive determination is performed at Step S16, and the process proceeds to Step S18.

The positive determination at Step S18 advances the process to Step S19. Accordingly, in this case, the setting of the lower limit L described in FIG. 5 is cancelled. At Step S19, the lower limit L of the pulley 42 is switchingly set from a current value to the first lower limit L1, thereby ensuring setting the lower limit L without the gradual change.

The following describes one example of a timing chart illustrating changes in various parameters in the deceleration during returning to Low with reference to FIG. 7.

Figure 7:
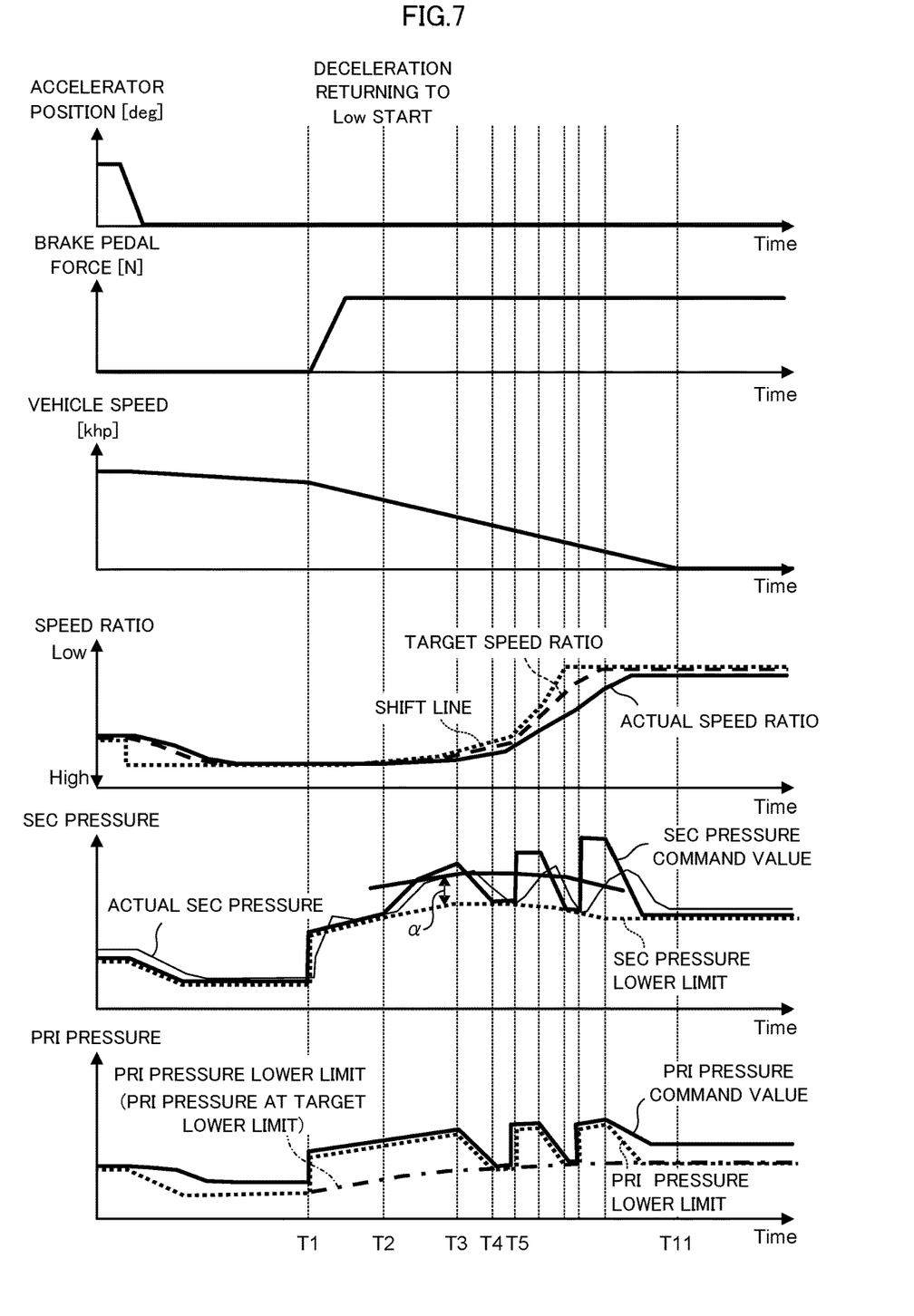
FIG. 7 is a drawing illustrating one example of a timing chart in the first embodiment.

First, the following describes the change before a timing T1. Before the timing T1, the accelerator position starts decreasing and thereafter becomes zero. Consequently, the accelerator pedal is disengaged.

Regarding the speed ratio of the transmission 4, the shift line indicated by the dotted line shows a final target speed ratio. According to the change in the accelerator position, the shift line is switched to the setting with the accelerator position being zero. Consequently, the speed ratio shown by the shift line stepwisely changes. The target speed ratio indicated by the dashed line gradually changes to the speed ratio shown by the shift line, and the actual speed ratio indicated by the solid line also changes according to this change.

Regarding the SEC pressure, a SEC pressure lower limit indicated by the dotted line is a SEC pressure to generate the lower limit L of the pulley 43 and changes according to the input torque to the transmission 4, thereby the accelerator position. The SEC pressure lower limit specifically generates the first lower limit L1. A SEC pressure command value indicated by the solid line changes according to the target speed ratio with the SEC pressure lower limit indicated by the dotted line as the lower limit value. The actual SEC pressure indicated by the thin line changes according to the SEC pressure command value. In other words, the SEC pressure command value is the target hydraulic pressure for the SEC pressure.

Regarding the PRI pressure, a PRI pressure lower limit indicated by the dotted line is a PRI pressure to generate the lower limit L of the pulley 42 and changes according to the input torque to the transmission 4, thereby the accelerator position. The PRI pressure lower limit indicated by the dotted line generates the first lower limit L1 or the second lower limit L2 as described later. A PRI pressure command value indicated by the solid line changes according to the target speed ratio with the PRI pressure lower limit indicated by the dotted line as the lower limit value. It should be noted that, although not illustrated, the actual PRI pressure changes according to the PRI pressure command value. In other words, the PRI pressure command value is the target hydraulic pressure for the PRI pressure.

The vehicle speed lowers slowly through the disengagement of the accelerator pedal. Accordingly, disengaging the accelerator pedal starts the deceleration of the vehicle.

At the timing T1, the brake pedal 63 starts to be pressed. From the timing T1, a brake pedal force increases and the vehicle speed substantially starts lowering compared with the vehicle speed before the timing T1.

At the timing T1, the SEC pressure lower limit indicated by the dotted line increases by the amount corresponding to the sudden braking thrust. The SEC pressure command value also increases according to this increase. The same applies to the PRI pressure lower limit indicated by the dotted line and the PRI pressure command value indicated by the solid line. The PRI pressure lower limit indicated by the one dot chain line shows the PRI pressure to generate the target lower limit for the second lower limit L2.

From the timing T1, the braking and the regeneration are performed, increasing the input torque to the transmission 4. In view of this, from the timing T1, the SEC pressure lower limit indicated by the dotted line further increases according to the increase in the input torque to the transmission 4. The SEC pressure command value also increases according to this increase. The same applies to the PRI pressure lower limit indicated by the dotted line and the PRI pressure command value indicated by the solid line.

At a timing T2, the target speed ratio becomes on the Low side relative to the actual speed ratio, being determined as the deceleration during returning to Low. In view of this, from the timing T2, the SEC pressure command value is further raised by the amount corresponding to the shift thrust. From the timing T2 until a timing T3, raising the SEC pressure among the PRI pressure and the SEC pressure promotes the returning to Low.

From the timing T2, whether the actual SEC pressure indicated by the thin line is larger than a sum of the SEC pressure lower limit indicated by the dotted line and the predetermined value α, in other words, whether the actual SEC pressure is larger than the sum of the first guaranteed capacity pressure and the predetermined value α is determined.

As a result of the change according to the SEC pressure command value indicated by the solid line, the actual SEC pressure indicated by the thin line becomes larger than the sum of the SEC pressure lower limit and the predetermined value α at a timing T3. In view of this, from the timing T3, the PRI pressure lower limit indicated by the dotted line gradually lowers. The PRI pressure command value indicated by the solid line also lowers according to this reduction. Consequently, the actual primary pressure also lowers. This ensures promoting the returning to Low on the primary pulley 42 side.

From the timing T3, by the amount that the returning to Low is promoted on the primary pulley 42 side, the returning to Low needs not to be promoted on the secondary pulley 43 side. In view of this, from the timing T3, the SEC pressure command value indicated by the solid line gradually lowers by the amount corresponding to the shift thrust, and the actual SEC pressure indicated by the thin line also gradually lowers according to this reduction. At this time, the SEC pressure command value gradually changes according to the change in the PRI pressure command value.

The PRI pressure lower limit indicated by the dotted line generates the first lower limit L1 at the pulley 42 until the timing T3 and generates the second lower limit L2 at the pulley 42 from the timing T3. The PRI pressure lower limit indicated by the dotted line becomes the PRI pressure lower limit indicated by the one dot chain line at a timing T4.

The SEC pressure command value indicated by the solid line becomes the SEC pressure lower limit indicated by the dotted line at the timing T4, and the actual SEC pressure indicated by the thin line becomes the SEC pressure lower limit indicated by the dotted line at a timing T5. In view of this, at the timing T5, the PRI pressure lower limit indicated by the dotted line is again raised by the amount corresponding to the sudden braking thrust from the PRI pressure lower limit indicated by the one dot chain line. The PRI pressure command value indicated by the solid line is also raised according to this increase. Accordingly, the actual PRI pressure is also raised. At the timing T5, the SEC pressure command value indicated by the solid line is also raised again to secure the shift thrust.

From the timing T2 to the timing T5, as a result of the returning to Low being thus promoted, the actual speed ratio changes to the Low side. Furthermore, from the timing T3 to the timing T5, the shift thrust is secured while the actual SEC pressure is reduced. This allows avoiding an insufficient amount of oil of the input and output of the amount of oil of the pulley 42 and the pulley 43, improving return performance to Low.

From the timing T5, the change similar to the change between the timing T2 and the timing T5 is repeated, promoting the returning to Low. The control of the returning to Low can be terminated at a timing T11 where the vehicle speed becomes zero.

From the timing T3, to secure the shift thrust while the actual SEC pressure is reduced, a quick reduction in the actual PRI pressure is desired.

In view of this, the lower limit value may be set to the actual PRI pressure by a magnitude of a reduction gradient, that is, a degree of reduction according to the time. This allows avoiding an excessively slow reduction in the actual PRI pressure. Consequently, the reduction in the shift responsiveness can reduce providing an uncomfortable feeling with the driver. The lower limit value can be set in the range of not providing the uncomfortable feeling.

On the other hand, the excessive, sharp reduction in the actual PRI pressure increases an undershoot of the actual PRI pressure. In this case, when the actual PRI pressure is attempted to be increased according to the PRI pressure command value indicated by the solid line at the timing T5, the actual PRI pressure becomes less than the PRI pressure lower limit indicated by the one-dot chain line, possibly causing the slip of the belt 44 at the primary pulley 42.

In view of this, the upper limit value may be set to the magnitude of the reduction inclination to the actual PRI pressure. This also can prevent a situation of causing the slip of the belt 44 at the primary pulley 42 as described above.

Next, the following further describes the first lower limit L1 and the second lower limit L2, which are described above in FIG. 5 and other drawings.

Here, the first lower limit generates the first guaranteed capacity. The first guaranteed capacity is a guaranteed capacity generated by the first lower limit L1.

The thrust by the amount corresponding to the cooperative regenerative torque in the fundamental thrust FA constituting the first lower limit L1 generates the cooperative regeneration capacity that can transmit the torque input to the transmission 4 in association with the regeneration by the motor-generator 2.

When the sudden braking, one example of the braking, is performed, the sudden braking thrust in the first correction thrust FB1 constituting the first lower limit L1 generates the first braking capacity that can transmit the torque input to the transmission 4 in association with the sudden braking as one example of the braking in this case.

In view of this, the first lower limit L1 generates the first guaranteed capacity and the first guaranteed capacity includes the cooperative regeneration capacity and the first braking capacity.

The second lower limit is as follows.

Here, the second lower limit generates a second guaranteed capacity. The second guaranteed capacity is a guaranteed capacity generated by the second lower limit L2.

Similar to the case of the first lower limit L1, the thrust by the amount corresponding to the cooperative regenerative torque in the fundamental thrust FA constituting the second lower limit L2 generates the cooperative regeneration capacity.

The low setting thrust in the second correction thrust FB2 constituting the second lower limit L2 generates the second braking capacity, which is set lower than the first braking capacity.

Accordingly, the second lower limit L2 generates the second guaranteed capacity, and the second guaranteed capacity includes the cooperative regeneration capacity and the second braking capacity.

The following describes main operational advantages of the vehicle of this embodiment. The vehicle of this embodiment includes the transmission 4 including the motor-generator 2, the pulley 42, the pulley 43, and the belt 44; the shift hydraulic control unit 7 controlling the PRI pressure and the SEC pressure; and the CVTCU 81.

While the accelerator pedal is in the OFF state, that is, when the transmission 4 is downshifted with no acceleration request from the driver, the CVTCU 81 configures the following settings.

That is, the CVTCU 81 sets the pulley thrust of the secondary pulley 43 on the basis of the first lower limit L1, the sum of the fundamental thrust FA and the first correction thrust FB1, as the lower limit L. The CVTCU 81 sets the pulley thrust at the primary pulley 42 on the basis of the second lower limit L2, the sum of the fundamental thrust FA and the second correction thrust FB2, as the lower limit L.

To say briefly using the torque capacity and the target hydraulic pressure, the CVTCU 81 sets the target hydraulic pressure for the SEC pressure on the basis of the first guaranteed capacity including the cooperative regeneration capacity and the first braking capacity as the guaranteed capacity. The CVTCU 81 sets the target hydraulic pressure for the PRI pressure on the basis of the second guaranteed capacity including the cooperative regeneration capacity and the second braking capacity as the guaranteed capacity.

The vehicle with such configuration sets the target hydraulic pressure for the PRI pressure and the target hydraulic pressure for the SEC pressure on the basis of the cooperative regeneration capacity during the downshift. Accordingly, the increase in the torque input to the transmission 4 in association with the regeneration by the motor-generator 2 does not cause the belt 44 to slip.

The vehicle with such configuration sets the target hydraulic pressure for the SEC pressure on the basis of the first braking capacity during the downshift. Accordingly, the sandwiching force of the belt 44 corresponding to the first braking capacity can be generated at the secondary pulley 43. According to this, the belt 44 is pulled from the pulley 42 side to the pulley 43 side. Accordingly, even if the hydraulic pressure according to the first braking capacity does not act on the primary pulley 42, the sandwiching force of the belt 44 according to the first braking capacity can be generated at the primary pulley 42. The vehicle with such configuration does not cause the belt 44 to slip during the sudden braking.

Accordingly, the vehicle with such configuration achieves the improvement in fuel efficiency by the regeneration by the motor-generator 2 even during the sudden braking.

The vehicle with such configuration sets the target hydraulic pressure for the PRI pressure on the basis of the second braking capacity, which is set lower than the first braking capacity. Therefore, lowering the PRI pressure allows increasing the differential pressure between the PRI pressure and the SEC pressure. Accordingly, the vehicle with such configuration can also enhance the shift responsiveness.

With the vehicle of this embodiment, the CVTCU 81 sets the low setting thrust lower than the sudden braking thrust during the downshift. In other words, the CVTCU 81 sets the second braking capacity lower than the first braking capacity during the downshift. When the CVTCU 81 sets the second braking capacity lower than the first braking capacity, if the actual SEC pressure becomes less than the SEC pressure lower limit as the first guaranteed capacity pressure as illustrated at the timing T5 in FIG. 7, the shift hydraulic control unit 7 increases the actual PRI pressure more than the actual PRI pressure at the time point when the actual SEC pressure becomes less than the SEC pressure lower limit.

The vehicle with such configuration lowers the tensile force of the belt 44 in association with the reduction in the actual PRI pressure. As a result of increasing the volume of the secondary hydraulic chamber 46 according to this reduction, the reduction in the actual SEC pressure can be reduced. In view of this, as a result of lowering the sandwiching force of the belt 44 at the secondary pulley 43, the slip of the belt 44 can be reduced.

With the vehicle of this embodiment, when the actual SEC pressure becomes less than the SEC pressure lower limit, the CVTCU 81 causes the shift hydraulic control unit 7 to increase the actual PRI pressure by the amount according to the sudden braking thrust from the PRI pressure lower limit indicated by the one dot chain line in FIG. 7. In other words, when the actual SEC pressure becomes less than the first guaranteed capacity pressure, the CVTCU 81 causes the shift hydraulic control unit 7 to increase the actual PRI pressure to increase the second braking capacity up to the first braking capacity.

The CVTCU 81 with such configuration allows reliably preventing the actual SEC pressure from lowering. As a result of the reduction in the sandwiching force of the belt 44 at the secondary pulley 43, the slip of the belt 44 can be prevented.

Second Embodiment

The vehicle of this embodiment is configured similarity to the vehicle of the first embodiment except for configurations of the CVTCU 81 further described below.

Figure 8:
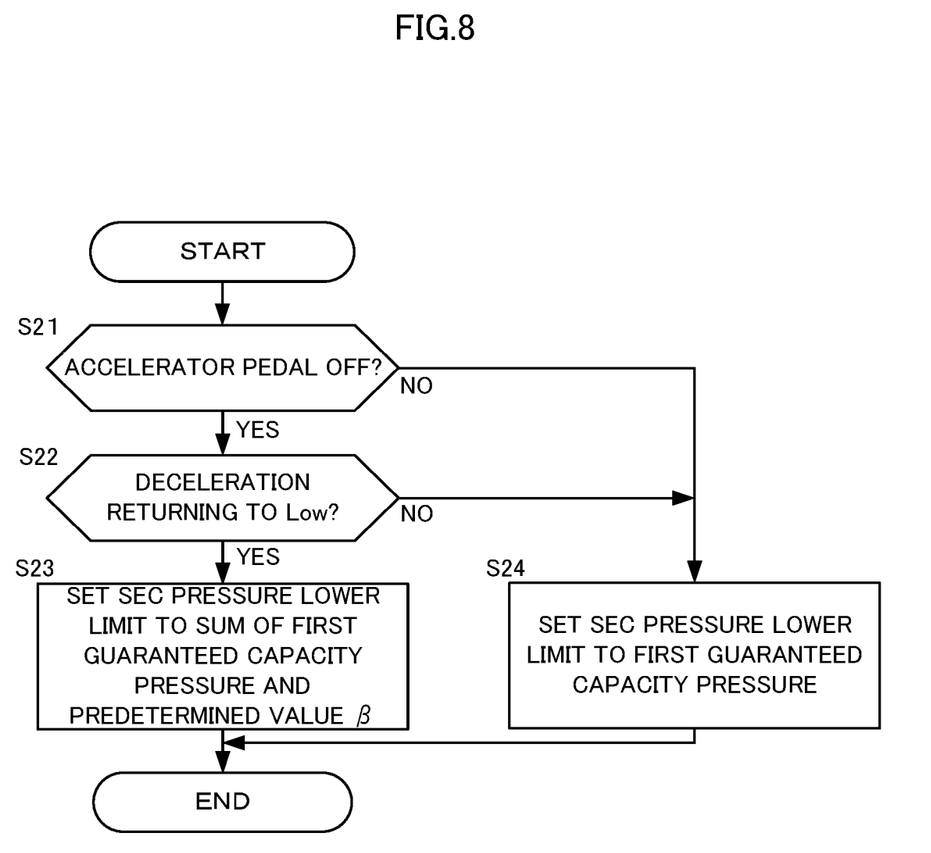
FIG. 8 is a drawing illustrating one example of a control in a second embodiment by a flowchart.

FIG. 8 is a drawing illustrating one example of the control performed by the CVTCU 81 and one example of the setting method for the lower limit L at the secondary pulley 43 by a flowchart. The CVTCU 81 can repeatedly perform the processes of this flowchart by minute time.

At Step S21 and Step S22, as illustrated in the drawing, the processes similar to Step S11 and Step S12 are performed.

The negative determination at Step S21 or Step S22 advances the process to Step S24. In this case, the CVTCU 81 sets the SEC pressure lower limit to a first capacity guaranteed pressure.

The positive determinations at Step S21 and Step S22 advance the process to Step S23. In this case, the CVTCU 81 sets the SEC pressure lower limit to a sum of the first capacity guaranteed pressure and a predetermined value β. The predetermined value β is set as follows.

Here, even if, for example, a reduction command is stepwisely executed on the SEC pressure, a decrease rate is restricted so as to lower the SEC pressure at a predetermined reduction inclination because of the following reason. Since the SEC pressure is a hydraulic pressure in charge of the sandwiching force to avoid the belt 44 to slip, the restriction prevents the insufficient SEC pressure due to the sudden change and the slip of the belt 44.

In view of this, the predetermined value β is set such that the SEC pressure lower limit increases by the amount of the magnitude of the undershoot that may be generated when the actual SEC pressure is lowered down to the target, such as the first capacity guaranteed pressure at the predetermined decrease rate. This allows the actual SEC pressure to not fall below the original SEC pressure lower limit, namely, the first guaranteed capacity pressure. After Step S23 or Step S24, the processes of this flowchart are terminated.

The following describes one example of a timing chart of this embodiment illustrating changes in various parameters in the deceleration during returning to Low with reference to FIG. 9.

Figure 9:
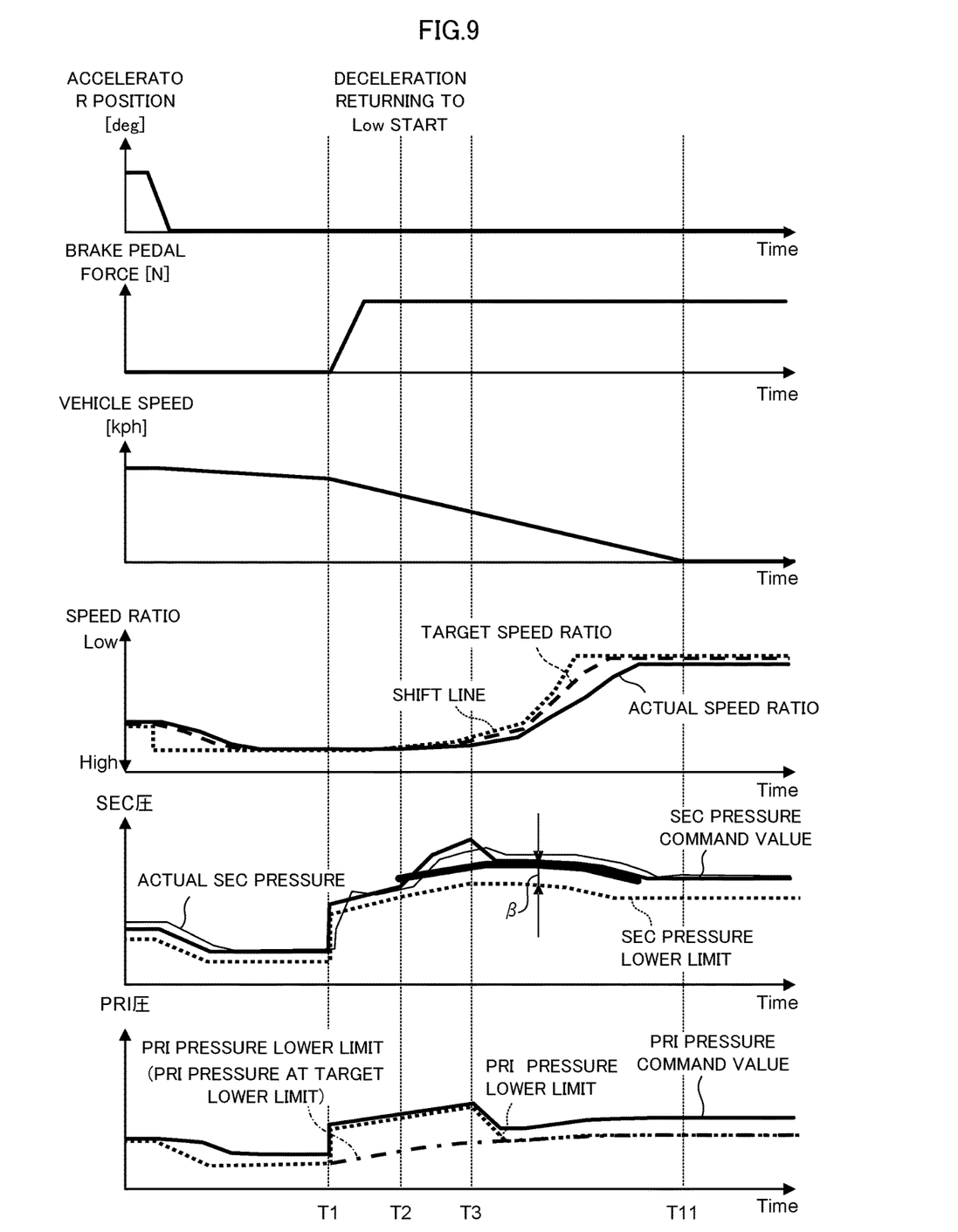
FIG. 9 is a drawing illustrating one example of a timing chart in the second embodiment.

The changes in various parameters from a timing T1 to a timing T3 are similar to the case of FIG. 7.

At the timing T3, the target speed ratio becomes on the Low side relative to the actual speed ratio and is determined as the deceleration during returning to Low. In view of this, from the timing T3, the SEC pressure lower limit is changed to the SEC pressure lower limit indicated by the bold line from the SEC pressure lower limit indicated by the dotted line. The SEC pressure lower limit indicated by the bold line is set to the SEC pressure lower limit indicated by the dotted line, namely, a sum of the first capacity guaranteed pressure and the predetermined value β.

Afterwards, when the SEC pressure command value indicated by the solid line becomes the SEC pressure lower limit indicated by the bold line, the SEC pressure command value is restricted to the SEC pressure lower limit indicated by the bold line. The PRI pressure command value indicated by the solid line fails to decrease enough by the amount corresponding to the predetermined value β.

In view of this, in this embodiment, to secure the shift thrust by the primary pulley 42, the reductions in the actual PRI pressure and the actual SEC pressure performed from the timing T3 are reduced compared with the case of the first embodiment. Accordingly, this allows configuring the actual SEC pressure so as not to become equal to or less than the SEC pressure lower limit indicated by the dotted line, namely, the first guaranteed capacity pressure. Consequently, the PRI pressure command value and the SEC pressure command value can be avoided so as not to vary repeating the increase and decrease.

As apparent from Step S14 and Step S18 in the above-described flowchart illustrated in FIG. 6, to set the lower limit L of the primary pulley 42, the SEC pressure lower limit indicated by the dotted line, namely, the first capacity guaranteed pressure becomes the target for comparison with the actual SEC pressure.

The following describes main operational advantages of the vehicle of this embodiment.

Here, with the first embodiment, the actual PRI pressure is increased at the timing T5 illustrated in FIG. 7. However, in this case, due to a delay of response of the hydraulic pressure, a difference in a pressure-receiving area between the pulley 42 and the pulley 43, and a similar cause, the actual pressure possibly does not change as the command value in the respective pulley 42 and pulley 43. Consequently, the speed ratio varies, possibly providing the uncomfortable feeling with the driver. Especially, in the case where the command value varies repeating the increase and decrease, as a result of repeated variation of the speed ratio, a possibility of providing the uncomfortable feeling with the driver further increases.

With the vehicle of this embodiment, the CVTCU 81 sets the SEC pressure command value with the value found by adding the predetermined value β to the first capacity guaranteed pressure as the SEC pressure lower limit; therefore, this allows avoiding the actual SEC pressure not to become equal to or less than the first capacity guaranteed pressure. This allows preventing the driver from feeling uncomfortable due to the variation of the speed ratio generated as described above.

The similar change is also applicable to the case where the CVTCU 81 is not configured thus, not only the case where the CVTCU 81 is configured to increase the actual PRI pressure at the timing T5 illustrated in FIG. 7 with the vehicle of the first embodiment.

The embodiments of the present invention described above are merely illustration of a part of application examples of the present invention and not of the nature to limit the technical scope of the present invention to the specific constructions of the above embodiments.

For example, the above-described embodiments describe the case where the returning to Low of the speed ratio performed without the acceleration request from the driver, that is, the downshift of the transmission 4 is performed while the brake pedal 63 is pressed. However, the downshift of the transmission 4 performed without the acceleration request from the driver may be performed while the brake pedal 63 is not pressed.

The present application claims a priority based on JP2015-059517 filed before the Japanese Patent Office on Mar. 23, 2015, the entire contents thereof is incorporated herein by reference.

The invention claimed is:

1. A vehicle comprising:
   a motor-generator:
   a variator to which a driving force from the motor-generator is transmitted, the variator including:
      a primary pulley whose groove width is changed by controlling a primary pressure;
      a secondary pulley whose groove width is changed by controlling a secondary pressure; and
      a belt wound around the primary pulley and the secondary pulley; and
   a controller configured to control the primary pressure and the secondary pressure, the controller being configured such that when a downshift of the variator is performed without an acceleration request from a driver, the controller:

sets a target hydraulic pressure for the secondary pressure on a basis of a first guaranteed capacity, the first guaranteed capacity including, as a torque capacity guaranteed at the secondary pulley during the downshift, a cooperative regeneration capacity and a first braking capacity, wherein a torque input to the variator in association with a regeneration by the motor-generator is transmittable at the cooperative regeneration capacity, and a torque input to the variator in association with braking, when the braking is performed, is transmittable at the first guaranteed capacity, and sets a target hydraulic pressure for the primary pressure on a basis of a second guaranteed capacity, the second guaranteed capacity including, as a torque capacity guaranteed at the primary pulley during the downshift, the cooperative regeneration capacity and a second braking capacity, wherein the second braking capacity is set lower than the first braking capacity.

2. The vehicle according to claim 1, wherein:
the controller is configured to
  set the second braking capacity lower than the first braking capacity during the downshift; and
  when an actual pressure of the secondary pressure becomes less than a first guaranteed capacity pressure which generates the first guaranteed capacity upon setting the second braking capacity lower than the first braking capacity, increase an actual pressure of the primary pressure more than the actual pressure of the primary pressure at a time point when the actual pressure of the secondary pressure becomes less than the first guaranteed capacity pressure.

3. The vehicle according to claim 2, wherein the controller is configured such that
  when the actual pressure of the secondary pressure becomes less than the first guaranteed capacity pressure which generates the first guaranteed capacity, the controller increases the actual pressure of the primary pressure to increase the second braking capacity up to the first braking capacity.

4. The vehicle according to claim 1, wherein
the controller is configured to set the target hydraulic pressure for the secondary pressure with a value as a lower limit value, wherein the value is obtained by adding a predetermined value to a first guaranteed capacity pressure which generates the first guaranteed capacity.

5. A method for controlling a vehicle that includes a motor-generator and a variator to which a driving force from the motor-generator is transmitted, the variator including a primary pulley whose groove width is changed by controlling a primary pressure, a secondary pulley whose groove width is changed by controlling a secondary pressure, and a belt wound around the primary pulley and the secondary pulley, the method being configured to control the primary pressure and the secondary pressure, the method comprising:

when a downshift of the variator is performed without an acceleration request from a driver,
  setting a target hydraulic pressure for the secondary pressure on a basis of a first guaranteed capacity, the first guaranteed capacity including, as a torque capacity guaranteed at the secondary pulley during the downshift, a cooperative regeneration capacity and a first braking capacity, wherein a torque input to the variator in association with a regeneration by the motor-generator is transmittable at the cooperative regeneration capacity, and a torque input to the variator in association with braking, when the braking is performed is transmittable at the first guaranteed capacity; and
  setting a target hydraulic pressure for the primary pressure on a basis of a second guaranteed capacity, the second guaranteed capacity including, as a torque capacity guaranteed at the primary pulley during the downshift, the cooperative regeneration capacity and a second braking capacity, wherein the second braking capacity is set lower than the first braking capacity.

6. A vehicle comprising:
a motor-generator;
a variator to which a driving force from the motor-generator is transmitted, the variator including:
  a primary pulley whose groove width is changed by controlling a primary pressure;
  a secondary pulley whose groove width is changed by controlling a secondary pressure; and
  a belt wound around the primary pulley and the secondary pulley; and
control means for controlling the primary pressure and the secondary pressure according to a target hydraulic pressure respectively, wherein
when a downshift of the variator is performed without an acceleration request from a driver,
  the target hydraulic pressure for the secondary pressure is set on a basis of a first guaranteed capacity, the first guaranteed capacity including, as a torque capacity guaranteed at the secondary pulley during the downshift, a cooperative regeneration capacity and a first braking capacity, wherein a torque input to the variator in association with a regeneration by the motor-generator is transmittable at the cooperative regeneration capacity, and a torque input to the variator in association with braking, when the braking is performed, is transmittable at the first guaranteed capacity; and
  the target hydraulic pressure for the primary pressure is set on a basis of a second guaranteed capacity, the second guaranteed capacity including, as a torque capacity guaranteed at the primary pulley during the downshift, the cooperative regeneration capacity and a second braking capacity, wherein the second braking capacity is set lower than the first braking capacity.

\* \* \* \* \*